(12) United States Patent
Webb et al.

(10) Patent No.: US 10,726,406 B2
(45) Date of Patent: *Jul. 28, 2020

(54) SYSTEM AND METHOD FOR DISPENSING AND PURCHASING FUEL

(71) Applicant: Walmart Apollo, LLC, Bentonville, AR (US)

(72) Inventors: Timothy W. Webb, Rogers, AR (US); Jason R. Todd, Lowell, AR (US); Danny K. Olivarez, Universal City, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/628,866

(22) Filed: Jun. 21, 2017

(65) Prior Publication Data
US 2017/0286936 A1 Oct. 5, 2017

Related U.S. Application Data

(63) Continuation of application No. 14/066,448, filed on Oct. 29, 2013, now Pat. No. 9,715,682.

(51) Int. Cl.
*G06Q 20/18* (2012.01)
*B67D 7/04* (2010.01)
(Continued)

(52) U.S. Cl.
CPC .............. *G06Q 20/18* (2013.01); *B67D 7/04* (2013.01); *B67D 7/348* (2013.01); *G06Q 20/145* (2013.01);
(Continued)

(58) Field of Classification Search
CPC ...... G06Q 20/20; G06Q 20/145; G06Q 20/18; G06Q 30/0635; B67D 7/04; B67D 7/348; G07F 13/025
See application file for complete search history.

(56) References Cited

U.S. PATENT DOCUMENTS 6,089,284 A * 7/2000 Kaehler ................. G06Q 50/06
141/94
9,715,683 B2 * 7/2017 Betancourt ............ G06Q 20/20
(Continued)

FOREIGN PATENT DOCUMENTS

EP 1168257 A1 1/2002
WO 2013/074998 A1 5/2013

OTHER PUBLICATIONS

Riekert, Adam, et al. "Fuel allocation and lockout system." 2018 IEEE International Conference on Industrial Electronics for Sustainable Energy Systems (IESES). IEEE, 2018.*
(Continued)

*Primary Examiner* — Asfand M Sheikh
(74) *Attorney, Agent, or Firm* — McCarter & English, LLP; David R. Burns

(57) ABSTRACT

A system for purchasing fuel is provided. The system includes, but is no limited to, a local device for retrieving identification information which identifies a fuel dispensing station, the identification information containing information identifying the fuel dispensing station from which fuel is desired to be purchased, and a remote server connected with the local device. Upon receiving the identification information at the local device, the local device automatically forwards the identification information along with a unique identifier to the remote server. The remote server generates and transmits an unlock code to the fuel dispensing station. The unlock code signals the fuel dispensing station to dispense fuel.

20 Claims, 5 Drawing Sheets

(51) Int. Cl.
*B67D 7/34* (2010.01)
*G06Q 30/06* (2012.01)
*G06Q 20/20* (2012.01)
*G06Q 20/14* (2012.01)
*G07F 13/02* (2006.01)

(52) U.S. Cl.
CPC ......... *G06Q 20/20* (2013.01); *G06Q 30/0635* (2013.01); *G07F 13/025* (2013.01)

(56) References Cited

U.S. PATENT DOCUMENTS

| | | | |
|---|---|---|---|
| 2005/0192832 A1 | 9/2005 | Call et al. | |
| 2007/0174082 A1* | 7/2007 | Singh | G06Q 20/20 705/44 |
| 2009/0043658 A1* | 2/2009 | Webb | G06Q 30/0224 705/14.25 |
| 2011/0218880 A1* | 9/2011 | Hammad | G06Q 20/32 705/26.41 |
| 2013/0006776 A1* | 1/2013 | Miller | G06Q 20/3276 705/14.65 |
| 2013/0091452 A1* | 4/2013 | Sorden | G06F 3/048 715/771 |
| 2013/0207605 A1 | 8/2013 | Errattuparambil et al. | |
| 2013/0211885 A1 | 8/2013 | Carpinteri | |
| 2013/0232019 A1 | 9/2013 | Frieden et al. | |
| 2013/0246171 A1 | 9/2013 | Carapelli | |
| 2014/0006188 A1* | 1/2014 | Grigg | G06Q 20/20 705/17 |
| 2014/0172157 A1* | 6/2014 | Bellamy, III | G07F 11/002 700/232 |
| 2015/0032558 A1* | 1/2015 | Bonk | G06Q 20/202 705/21 |

OTHER PUBLICATIONS

International Search Report issued in International Application No. PCT/US2014/062929, dated Jan. 29, 2015.
Written Opinion issued in International Application No. PCT/US2014/062929, dated Jan. 29, 2015.

* cited by examiner

SYSTEM AND METHOD FOR DISPENSING AND PURCHASING FUEL

CROSS REFERENCE TO RELATED APPLICATIONS

This application is a continuation of U.S. patent application Ser. No. 14/066,448, filed on Oct. 29, 2013, the contents of which is incorporated by reference herein in its entirety.

FIELD OF THE INVENTION

The present invention relates generally to purchasing items from a retail establishment. In particular, the invention relates a method for dispensing and purchasing fuel, such as gasoline, from a retail establishment using a mobile device.

BACKGROUND

Currently, retail establishments which dispense and sell fuel typically require the user to provide proof of funds in advance of dispensing any fuel. The proof of funds may be provided by pre-paying for the fuel in advance with a form of payment, such as cash, check or a credit card. The proof of funds may also be provided by obtaining a payment pre-authorization in advance from a credit card company, upon scanning of a user's credit card. The proof of funds may also be provided to a cashier of the retail establishment, or to a self-checkout station or kiosk at or near the fuel dispensing station.

In either way, the user typically has to provide proof funds before dispensing fuel. This takes time and requires user interaction with either a cashier or a self-checkout station, adding time to the user's shopping experience. Additionally, as a result of this process, retail establishments have to invest in cashiers or self-checkout stations, and additional time is required from the customer to complete his purchase by having to go to a cashier or a self-checkout station. It would be desirable to provide a customer and a retail establishment with a method for purchasing and dispensing fuel from a retail establishment in a streamlined and timely manner.

SUMMARY

In one aspect, a system for purchasing fuel is provided. The system includes, but is not limited to, a local device for retrieving identification information which identifies a fuel dispensing station, the identification information containing information identifying the fuel dispensing station from which fuel is desired to be purchased, and a remote server connected with the local device. Upon receiving the identification information at the local device, the local device automatically forwards the identification information along with a unique identifier to the remote server. The remote server generates and transmits an unlock code to the fuel dispensing station. The unlock code signals the fuel dispensing station to dispense fuel.

In one aspect, a method for purchasing fuel is provided. The method includes, but is not limited to, retrieving identification information and location information which are used to identify a fuel dispensing station, and forwarding the identification information and location information to a remote server. Upon receiving the identification information and location information, the remote server generates and transmits an unlock code to the fuel dispensing station. The unlock code signals the fuel dispensing station to dispense fuel.

In one aspect, a non-transitory computer readable memory medium comprising program instructions for purchasing fuel using a local device is provided. The program instructions are executable by a processor to retrieve identification information and location information which are used to identify a fuel dispensing station from memory stored on a local device, forward the identification information and location information to a remote server, and generate and transmit an unlock code to the fuel dispensing station. The unlock code signals the fuel dispensing station to dispense fuel.

The scope of the present invention is defined solely by the appended claims and is not affected by the statements within this summary.

BRIEF DESCRIPTION OF DRAWINGS

The invention can be better understood with reference to the following drawings and description. The components in the figures are not necessarily to scale, emphasis instead being placed upon illustrating the principles of the invention.

DETAILED DESCRIPTION

The present invention makes use of the discovery that by using a local device with location identification capabilities and communications capabilities, a user can, with an application on the local device, identify a fuel dispensing station from which fuel is to be dispensed, provide payment pre-authorization in advance from a selected or predetermined form of payment, and in turn unlock the identified dispensing station so that fuel may be dispensed from the identified dispensing station.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those skilled in the art will appreciate that some of the acts and operations described hereinafter can also be implemented in hardware, software, and/or firmware and/or some combination thereof.

Figure 1A:
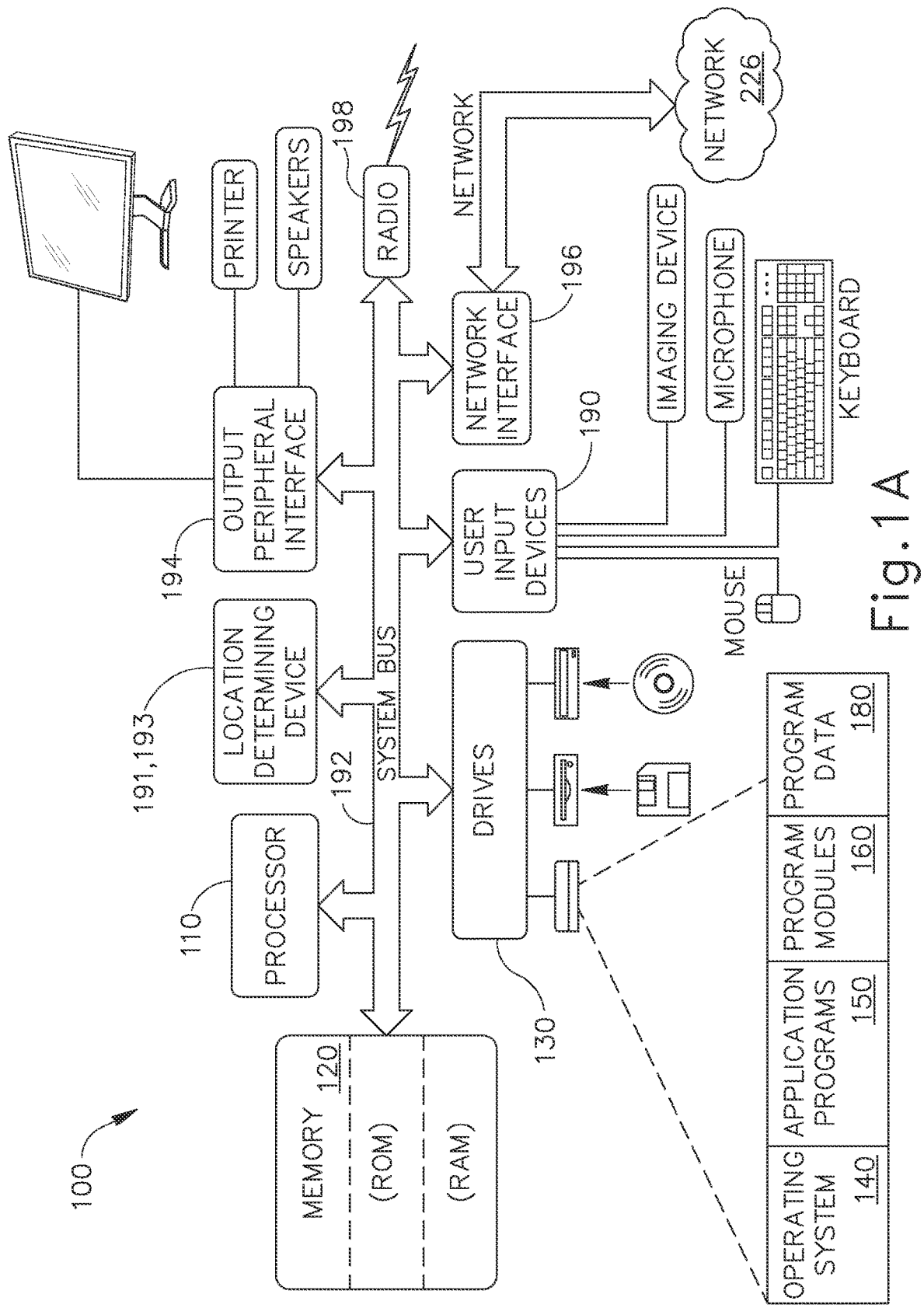
FIG. 1A depicts a block schematic diagram of an exemplary computing system, in accordance with one embodiment of the present invention.

With reference to FIG. 1A, depicted is an exemplary computing system for implementing embodiments. FIG. 1 includes a computer 100, which could be any one of a local device 200 or remote server 240. A local device 200 is any device which is locally accessible by the user, such as a mobile computer, a laptop computer, a mobile phone, an automotive computer system, a touchscreen computer, an automotive navigation system, and a kiosk. A remote server 240 is any computer system which is remote from the user and the local device 200 and receives and transmits information from and to the local device 200. Local device 200 may be a portable device, wherein at least some or all of its components are formed together in a single device which can be carried around by a person.

The computer 100 includes a processor 110, memory 120 and one or more drives 130. The drives 130 and their associated computer readable memory medium provide storage of computer readable instructions, data structures, program modules and other data for the computer 100. Drives 130 can include an operating system 140, application programs 150, program modules 160, and program data 180. Computer 100 further includes input devices 190 through which data may enter the computer 100, either automatically or by a user who enters commands and data. Input devices 190 can include an electronic digitizer, a flatbed scanner, a barcode reader, a microphone, a camera, a video camera, a keyboard and a pointing device, commonly referred to as a mouse, a trackball or a touch pad, a pinpad, any USB device, any Bluetooth enabled device, an RFID or NFC device, and a debit card reader. Other input devices may include a joystick, game pad, satellite dish, scanner, and the like. In one or more embodiments, input devices 190 are portable devices that can direct display or instantiation of applications running on processor 110. Computer 100 preferably includes a location determining device 191 which generates location information that is transmitted to the computer 100. Location determining device 191 is any device which can assist in generating location information or which generates location information, such as a satellite signal receiver which can receive Global Positioning System (GPS) signals or any other radio signals emanating from satellites which can be used to determine location, such as GLONASS signals, Galileo signals, Beidou signals, COMPASS signals, IRNSS signals, and QZSS signals. Additionally, location determining device 191 may include a radio receiver for receiving ground based radio signals, such as GPRS signals or any 2G, 3G, 4G, LTE or other type of commonly transmitted radio signal which may be used along with triangulation software to determine one's location and generate location information. Location determining device 191 may also include a wireless signal receiver and/or transmitter, a computer or a network of computers such as the Internet, a satellite, a compass, a gyroscope, or any combination of such which can generate or be used to generate location information 227.

Location information 227 includes data which can be used to determine the location of the location determining device 191, the computer 100, or the user of the computer 100. Location information 227 includes details as to the location of the local device 200, such as the coordinates of the local device 200, a name of a street, and/or address, and/or city, and/or state, and/or country in which the local device 200 is in or near. Preferably, location information 227 includes details as to the location of the local device 200 within 100 meters, and preferably within 50 meters, and preferably within 10 meters, and most preferably within 5 meters, and preferably within 3 meters, and preferably within one meter. The determined location information 227 is then communicated to a computer, such as computer 100. Location information 227 may be automatically generated by a location determining device 191 or manually input into the computer by a user, or created using a combination of manually entered and automatically generated information.

These and other input devices 190 can be connected to processor 110 through a user input interface that is coupled to a system bus 192, but may be connected by other interface and bus structures, such as a parallel port, game port or a universal serial bus (USB). Computers such as computer 100 may also include other peripheral output devices such as speakers, printers, and/or display devices, which may be connected through an output peripheral interface 194 and the like.

Computer 100 also includes a radio 198 or other type of communications device for wirelessly transmitting and receiving data for the computer 100 with the aid of an antenna. Radio 198 may wirelessly transmit and receive data using WiMAX™, 802.11a/b/g/n, Bluetooth™, 2G, 2.5G, 3G, and 4G, wireless standards.

Computer 100 may operate in a networked environment using logical connections to one or more remote computers, such as a remote server 240. The remote server 240 may be a personal computer, a server, a router, a network PC, a peer device or other common network node, and may include many if not all of the elements described above relative to computer 100. Networking environments are commonplace in offices, enterprise-wide computer networks, intranets and the Internet. For example, in the subject matter of the present application, computer 100 may comprise the source machine from which data is being migrated, and the remote computer may comprise the destination machine. Note, however, that source and destination machines need not be connected by a network or any other means, but instead, data may be migrated via any media capable of being written by the source platform and read by the destination platform or platforms. When used in a LAN or WLAN networking environment, computer 100 is connected to the LAN through a network interface 196 or an adapter. When used in a WAN networking environment, computer 100 typically includes a modem or other means for establishing communications over the WAN, such as radio 198, to environments such as the Internet. It will be appreciated that other means of establishing a communications link between computer 100 and other computers may be used.

Figure 1B:
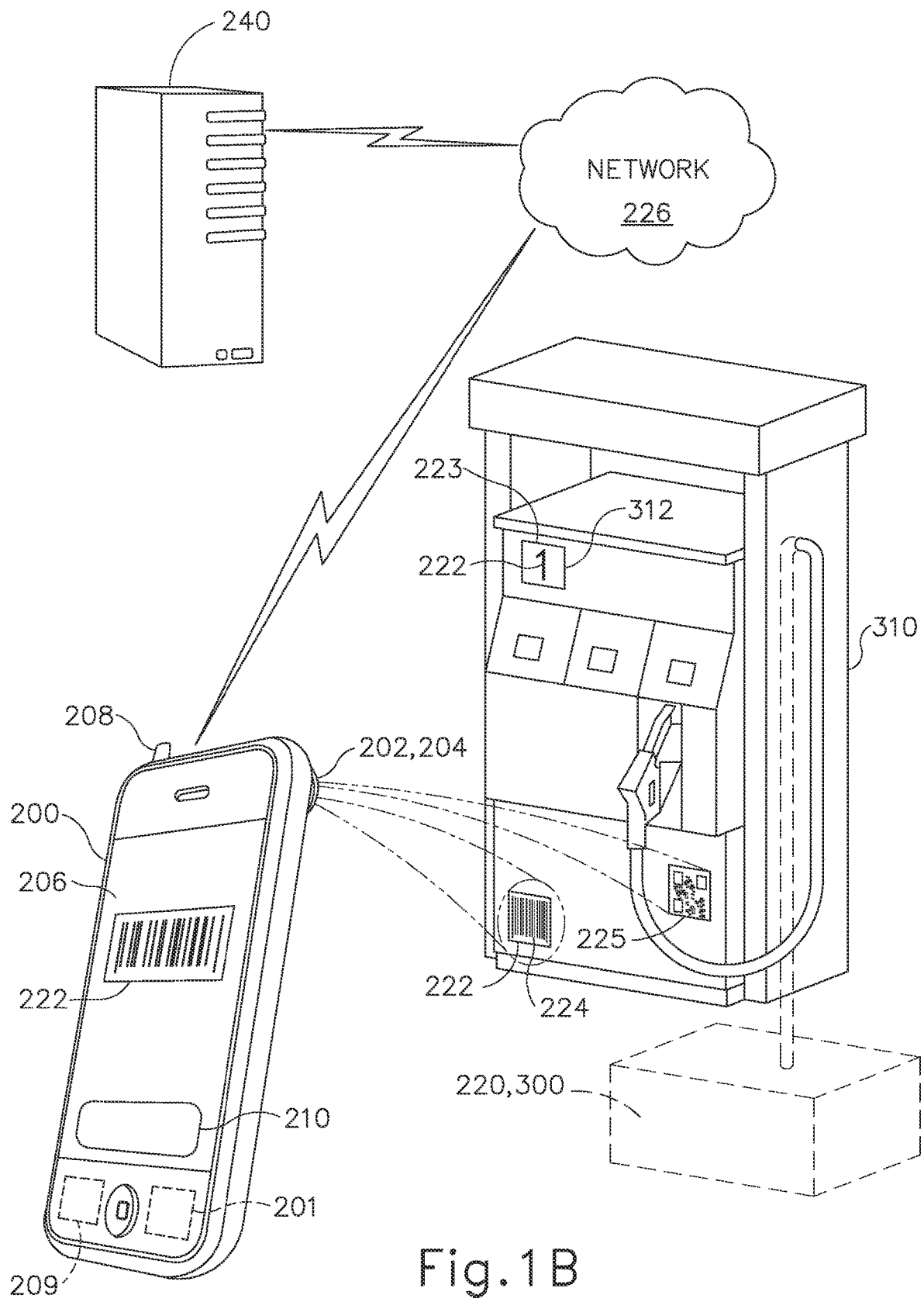
FIG. 1B depicts an illustration of a local or mobile device communicating with a remote server, in accordance with one embodiment of the present invention.

With reference to FIG. 1B, illustrated is an exemplary representation of a local device 200 for purchasing an item or service 220 from a retailer at a retail establishment. Local device 200 includes any transportable, local, mobile, or portable electronic device having a processor 201 for executing applications and a display 206 for displaying information connected with the processor 201, and includes such devices as a personal desktop assistant (PDA), a portable computer, a mobile telephone, a smartphone, a netbook, a mobile vehicular computer, a tablet computer, a kiosk, a handheld scanner, or a point of sale device. Display 206 can use any of a variety of types of display technologies, such as a liquid crystal display (LCD), a cathode-ray tube type display, an electronic ink display, a light emitting diode (LED) type display such as an OLED display, and a plasma display. Preferably, the local device 200 also includes a communications device 208 and a scanning module 202, such as a camera 204. The communications device 208 is connected with the processor 201 and capable of sending and receiving information between one or more other computers connected with the local device 200. Preferably, communications device 208 is capable of wirelessly transmitting signals to another computer, such as remote server 240, using a radio transmitter and a radio receiver connected with an antenna. The scanning module 202 is capable of receiving identification information 222 from an item or service 220 and converting the identification information 222 into a format that the processor 201 can read, such as digital data. Preferably, Scanning module 202 includes any device which can capture, receive and process information, near-field communication (NFC) sensor, such as a Quick Response (QR) code, a barcode or any image, and includes devices such as a digital scanner, a digital camera, a video camera, a barcode reader, and any other type of digital or analog imaging device.

Preferably, communications device 208 communicates with another computer 100, such as remote server 240, via a network 226 using a network interface 209. Network interface 209 is connected with processor 201 and communications device 208, and preferably disposed within remote device 200.

Network 226 may include any type of network that is capable of sending and receiving communication signals, including signals for multimedia content, images, data and streaming video. Network 226 may include a data network, such as the Internet, an intranet, a local area network (LAN), a wide area network (WAN), a cable network, and other like systems that are capable of transmitting information, such as digital data, and the like. Network 226 may also include a telecommunications network, such as a local telephone network, long distance telephone network, cellular telephone network, satellite communications network, cable television network and other like communications systems that interact with computer systems to enable transmission of information between local device 200 and another computer such as remote server 240. Network 226 may include more than one network and may include a plurality of different types of networks. Thus, network 226 may include a plurality of data networks, a plurality of telecommunications networks, cable systems, satellite systems and/or a combination of data and telecommunications networks and other like communication systems.

Network 226 is connected with both local device 200 and remote server 240 and allows for information to be transmitted and shared between local device 200 and remote server 240. Remote server 240 includes any type of computer which can receive, store, process, and transmit information to another computer and includes devices such as a server based computer system capable of interacting with one or more other computer systems.

In one embodiment, local device 200 includes location information processing means 193 which allows the local device 200 to determine its location. Location information processing means 193 preferably receives information from a location determining device 191, such a Global Positioning System (GPS) based device, a radio transmitter or receiver, a computer or a network of computers such as the Internet, a satellite, a compass, a gyroscope, manually entered information from the user, or any other device which can be used to detect one's location. Location determining device 191 is in communication with location information processing means 193 and may be remote from or part of the local device 200. Methods or systems for determining one's location, such as using radio triangulation to determine one's location, may be used by the location information processing means 193 to generate location information 227 or location information 227 may be transmitted to the location information processing means 193. Either way, location information processing means 193 enables the local device 200 to determine its location and generates location information 227 as a result.

Preferably, local device 200 includes input means 210 for entering information from a user into the local device 200. Input means 210 includes any device which can assist a user to enter information, such as a keyboard, a mouse, a touchpad, a touchscreen, a joystick, a button, a microphone, a camera, and a dial.

Item or service 220 includes any item or service which is being sold by a retail establishment. Item or service 220 includes items such as any merchandise being sold by a retail establishment, which may be located in the brick-and-mortar retail establishment, in another brick-and-mortar retail establishment, or online at a remote warehouse. Item or service 220 may include any service sold by a retail establishment, either locally which may be located in the brick-and-mortar retail establishment, or remote from the brick-and-mortar retail establishment, such as an extended warranty service.

Figure 2:
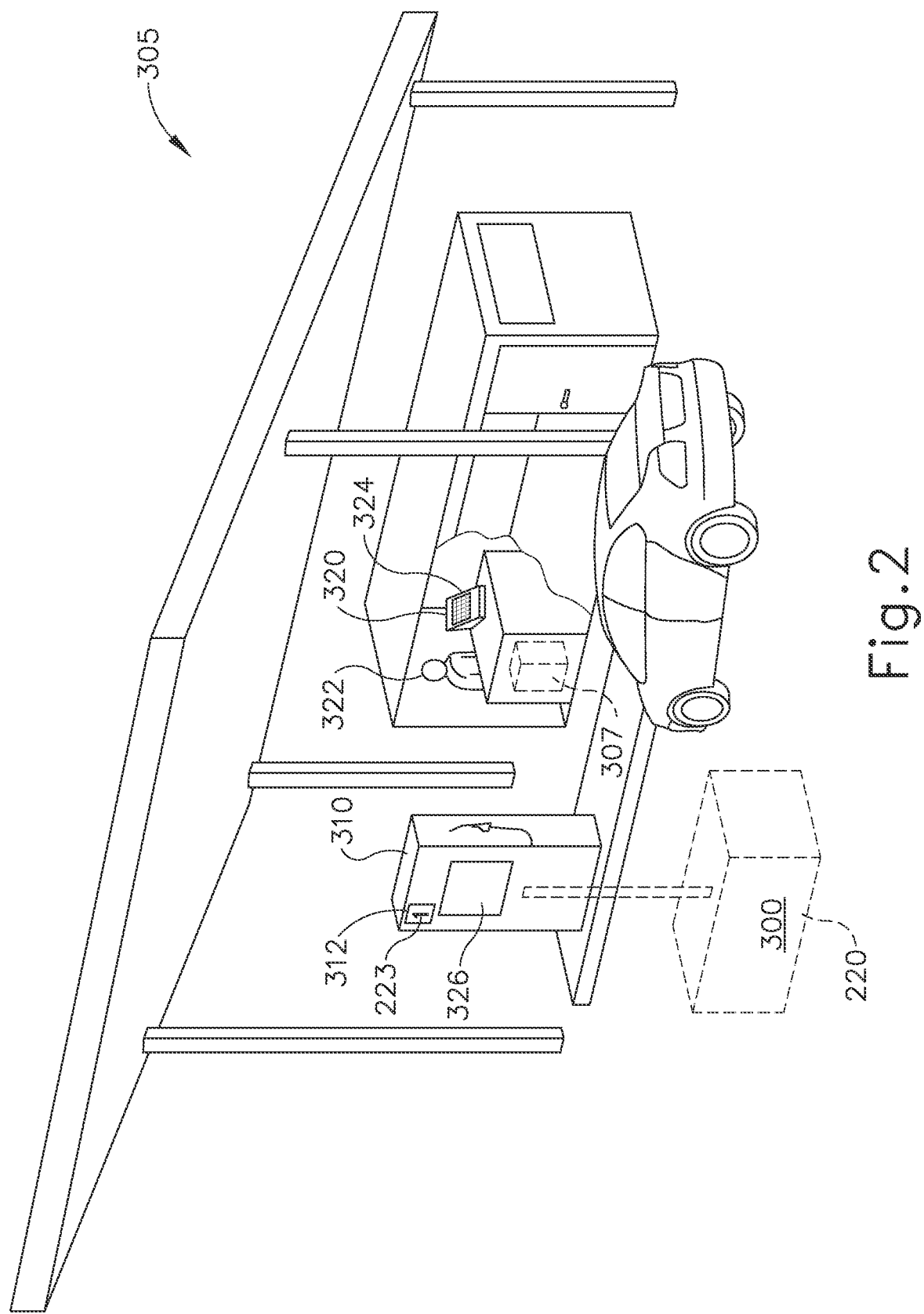
FIG. 2 depicts a fuel station which includes a fuel dispensing station for dispensing fuel, in accordance with one embodiment of the present invention.

With reference to FIGS. 1B and 2, in one embodiment, the item or service 220, includes fuel 300, which is to be dispensed from a fuel dispensing station 310. Fuel 300 includes any substance or element which may power a vehicle, such as, electricity, gasoline, ethanol, alcohol, oil, biofuel, hydrogen, natural gas, liquefied natural gas, propane. Fuel dispensing station 310 dispenses fuel and is preferably in communication with a point of sale (POS) system 320, such as a cashier 322, a cash register 324, or a self-checkout station 326 which may be connected with or part of fuel dispensing station 310.

A retail establishment may be either an online retail establishment which conduct business through the internet or a brick-and-mortar retail establishment which conduct business through a physical store or warehouse. A retail establishment includes a supermarket, a general retail store, a wholesale store, a charity organization, a restaurant, or any other place which sells goods or services. In one embodiment, the retail establishment is the fuel station 305 or is an entity which owns the fuel station 305. Preferably, the item or service 220 is located within a brick-and-mortar retail establishment or accessible by the brick-and-mortar retail establishment.

Item or service 220 preferably includes identification information 222 which is any information on the item or service 220 which assists in identifying the item or service 220. Preferably, the identification information 222 is encoded within an identification device 223, such as a label 312, a digitally encoded optical pattern like a QR Code 225 or barcode 224, a UPC code or other identification code, an NFC or other wireless sensor, illustrations, or images on the item or service 220 which can be used to encode identification information 222 used to identify the item or service 220. Preferably, identification information 222 is a manually entered identification code, an optically scannable code, or a radio frequency readable code, and may be retrieved from identification device 223 by optically scanning or using radio frequencies. Preferably, the identification information 222 includes information which identifies the item or service 220, such as a serial number, a name of the item or service 220, and any text, characters, or images used to identify the item or service 220, a product or item code or number, and any information 280 which links to a website which identifies the item or service 220, such as a website address. While identification information 222 may be on or near the item or service 220, identification information 222 may be on or near a variety of different mediums, such as a publically accessible medium as described herein.

In one embodiment, the identification information 222 includes identifying information which identifies a fuel dispensing station 310 from which fuel 300 is dispensed. For example, the fuel dispensing station 310 may have a label 312 comprised of a number, letter, or unique code posted on the station 310, such as "1", which identifies the fuel dispensing station 310. In such an example, the identification information 222 identifies the fuel dispensing station 310 by sending information from the label 312 identifying the fuel dispensing station 310 as station "1". Furthermore, item identification information 222 may include or be used to generate location information 227 used to identify the fuel dispensing station 310. For example, item identification information 222 may include the address or the city and state in which the fuel dispensing station 310 is located along with identifying information which identifies the fuel dispensing station 310.

Identification information 222 may be automatically generated using location information 227, it may be manually entered by the user, or it may be generated using both automatically generated information, such as location information 227, and manually generated information, such as information manually entered by the user identifying the label 312 of the fuel dispensing station 310. In one embodiment, the user manually enters the identification information 222 into the local device 200. The user may manually enter identification information 222 into the local device 200 by scanning or taking a picture of the identification information 222, such as by scanning a label or identification device 223 (i.e. an NFC sensor) on or near the fuel dispensing station 310. The user may manually enter identification information 222 into the local device 200 by entering into the device 200 the name or other identifying information of the fuel dispensing station 310 using input means 210.

Figure 3:
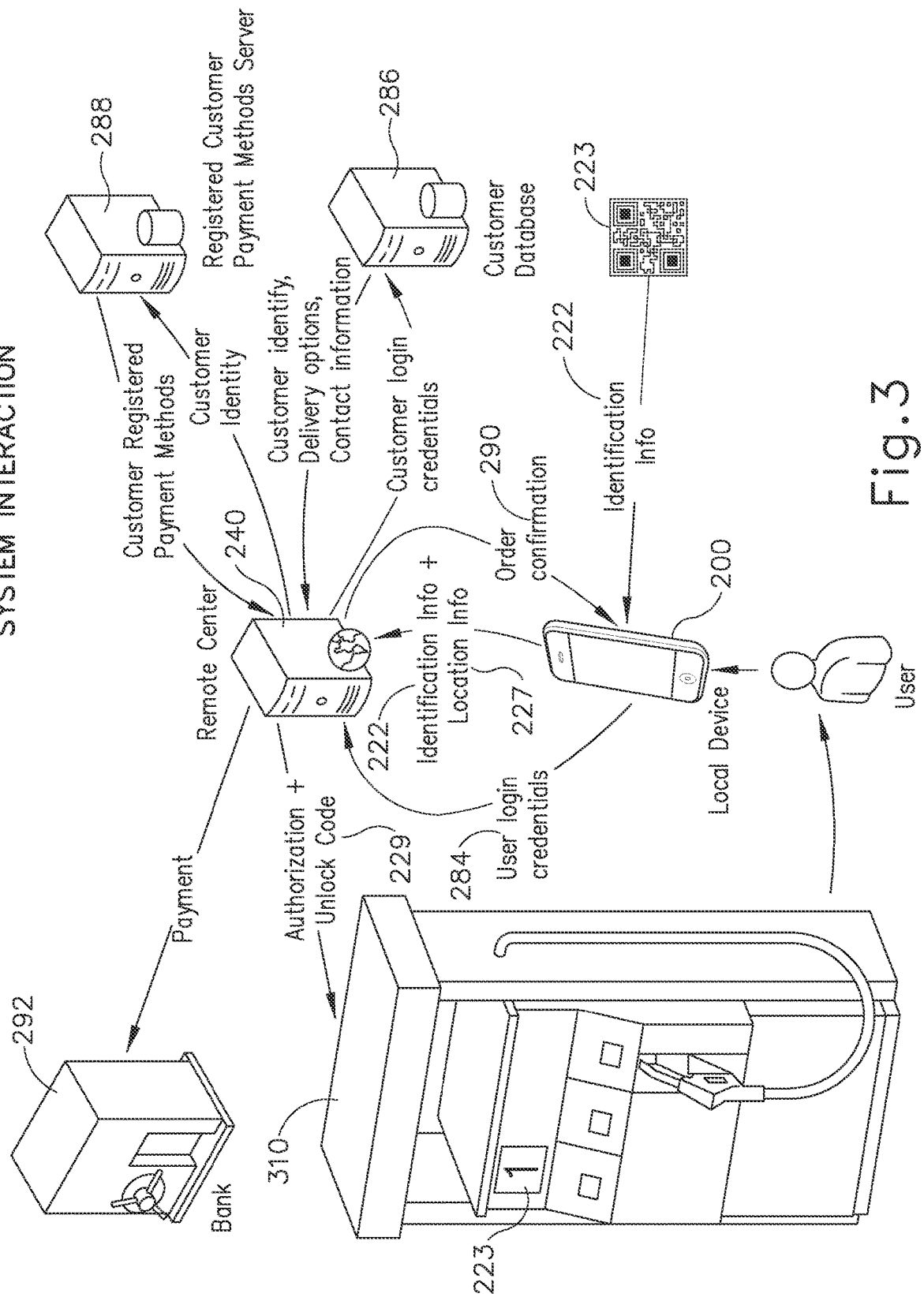
FIG. 3 depicts a system level flowchart of interactions between a customer or user, a local or mobile device, and a remote server, in accordance with one embodiment of the present invention.
Figure 4:
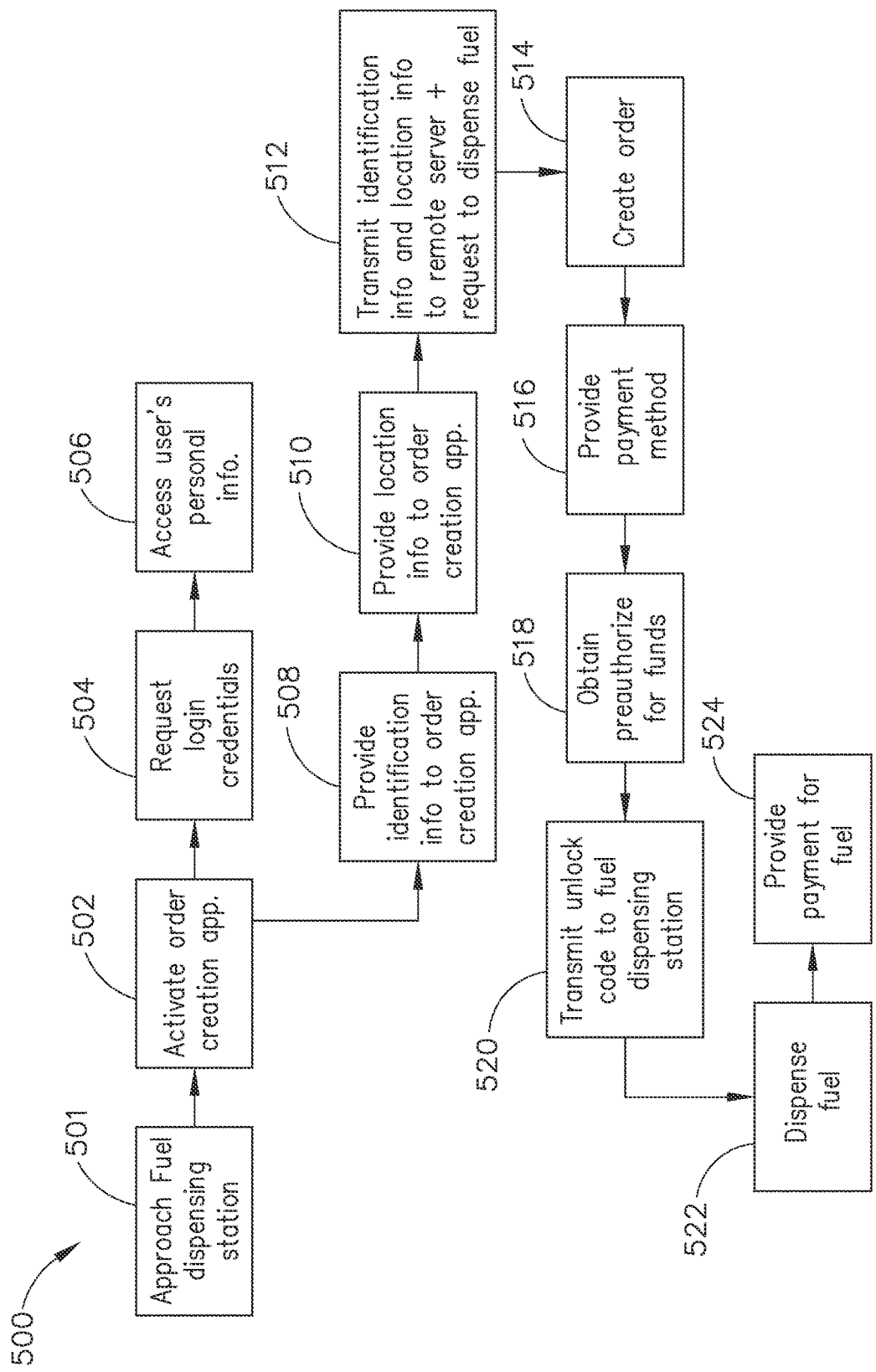
FIG. 4 depicts flowchart illustrations of methods, apparatus (systems) and computer program products, in accordance with one embodiment of the present invention.

With reference to FIGS. 2 and 3, shown is a method 500 for purchasing fuel 300 using a local device 200. In operation, the method begins at block 501 when the local device 200 or a user using the local device 200 approaches a fuel dispensing station 310 within a fuel station 305. At block 502, the user then activates an order creation application 400 in order to facilitate the purchasing of fuel from the fuel dispensing station 310. In one embodiment, upon opening the order creation application 400, the order creation application 400 then preferably sends the local device 200, preferably through the remote server 240, a request for user login credentials 284 at block 504. The user login credentials 284 is some additional information from the user which helps to uniquely identify the user, such as a password. Sometimes the user login credentials 284 are saved by the application 400 and no request for user login credentials 284 is made.

Upon receiving the user login credentials 284, the order creation application 400 accesses the user's personal information, at block 506, which may be stored remotely on the remote server 240 at a customer database 286, and the user's pre-registered payment method information which may be stored remotely at a customer payment methods server 288. The user's personal information may include the user's identity, name, address, delivery options, contact information, and personal preferences. The user's payment method information may include any one of the user's pre-registered payment methods associated with the user's account, such as a PayPal™ account or other online payment account information, credit card information, bank account information, and any other information related to a financial payment means which can be used to provide authorization of funds to purchase the item or service 220. Additionally, the user may enter a new payment method before payment for the order is authorized. The user may enter a payment method either by keying in a new payment method or scanning new payment information from a medium, such as a credit card.

Upon opening the order creation application 400, the user is either prompted to enter identification information 222 or identification information 222 is generated and provided to the order creation application 400 via the local device 200, at block 508. Identification information 222 may be automatically generated using location information 227, it may be manually entered by the user, or it may be generated using both automatically generated information, such as location information 227, and manually generated information, such as information manually entered by the user identifying the label 312 of the fuel dispensing station 310. Upon generating and/or entering the identification information 222 into the order creation application 400, location information 227 is also generated or manually entered into local device 200 and provided to the order creation application 400.

Preferably, the local device 200 is brought near to identification device 223, and identification information 222 is retrieved from the identification device 223 by the local device 200. For example, in one embodiment, the local device 200 may be brought near a QR code 225, and an image of the QR code 225 is captured by the local device 200. In another embodiment, the local device 200 may be brought near an NFC sensor and identification information 222 is retrieved from the NFC sensor onto the local device 200. In one embodiment, the user manually enters identification information 222.

Identification information 222, and identification device 223, may be situated in one of a variety of spots, such as on or near a fuel dispensing station 310. Additionally, identification information 222, and identification device 223, may be situated on a publically accessible medium such as in an advertisement, like an advertisement on a billboard or magazine, or situated on a publically accessible medium such as a product display, on or near a fuel dispensing station 310.

The identification information 222 is captured by or manually entered into the local device 200, preferably at the direction of the user, and then communicated along with location information 227, at block 510, to an order creation application 400. Location information 227 may be manually entered by the user or automatically generated by a location determining device 191 and/or location information processing means 193.

In addition, a unique identifier 282 may also be communicated to the order creation application 400 for the purposes of identifying the user. Preferably, the local device 200 transmits the unique identifier 282, to the order creation application 400. The unique identifier 282 includes any information which can uniquely identify the user, such as a mobile phone number, a mobile IMEI number, a user's account name, a user's password, a user's social security number, or other such information. The unique identifier 282 may be provided when the user provides login credentials or may be provided at some later point in time, such as before or after providing identification information 222 and/or location information 227.

Upon providing identification information 222 and location information 227 to the order creation application 400, the order creation application 400 transmits the identification information 222 and location information 227 to the remote server 240, at block 512, along with a request to permit the fuel dispensing station 310 to dispense fuel and create an order for the purchase of fuel, at block 514. Preferably, the order creation application 400 transmits the identification information 222 and location information 227 directly to the remote server 240, without connecting to the fuel dispensing station 310 and without transmitting through the fuel dispensing station 310.

As used herein, an order is any request to purchase an item or service 220. The order is comprised of information received from the order creation application 400, such as identification information 222, quantity information indicating how many units of a particular item or service 220 in the virtual shopping cart a user would like to purchase, user identification information, additional user information, an order number, and store identifying information which provides information that identifies the specific retail establishment in which the user is in.

Upon providing identification information 222 and location information 227 to the order creation application 400, the user may additionally specify which type of fuel he wishes to purchase along with a specific quantity or amount of fuel the user wishes to purchases.

Upon providing identification information 222 and location information 227 to the order creation application 400, a payment method is provided, at block 516, to the remote server 240 by either the local device 200 or another remote server, such as a payment methods server 288. The payment method is either a pre-registered payment method associated with the user's account or a new payment method which may be entered in real time by the user before payment for the order is authorized. The payment method may also include payment at a traditional point of sale terminal, the fuel dispensing station 310, or an electronic payment which bypassed the traditional point of sale terminal and is made through the order creation application 400.

Upon providing the payment method to the remote server 240, the remote server 240 communicates with a via a payment processing application that is connected to a financial computer system 292 of a financial institution in order to obtain a preauthorization for funds, at block 518, to be used in payment for the order of fuel. Upon receiving a preauthorization of funds from the financial computer system 292, the remote server 240 communicates with and transmits to the fuel dispensing station 310, or with computers 307 at a fuel station 305 which the fuel dispensing station 310 resides, to provides them with an unlock code 229 used to release the fuel dispensing station 310 and allow fuel to be dispensed from it, at block 520. Sometimes the release of the fuel dispensing station 310 is limited to a certain amount of fuel or a certain quantity of fuel. Upon the release of the fuel dispensing station 310, the user dispenses fuel from the fuel dispensing station 310 to the user's vehicle, at block 522.

Preferably, the unlock code 229 signals the fuel dispensing station 310 to dispense fuel without further interaction from a user. For example, the user need not touch or interact with an input devices, such as touchscreens or keyboards, on the fuel dispensing station in order to signal the fuel dispensing station 310 to dispense fuel. Preferably, upon receiving the unlock code 229 the fuel dispensing station 310 is placed in a state in which the fuel dispensing station 310 is able to dispense fuel, without further interaction from the user. The user only need grab a fuel dispensing handle, connect the fuel dispensing handle to the user's vehicle, and in some cases, squeeze the fuel dispensing handle.

Upon providing the fuel to the user's vehicle, the user then provides payment for the fuel, at block 524. The user may pay for the fuel at a traditional point of sale terminal, the fuel dispensing station 310, or an electronic payment which bypassed the traditional point of sale terminal and is made through the order creation application 400.

Preferably, before payment is made, the amount of the order is calculated and determined based on, but not limited to item prices, taxes, sale promotions, discounts, rebates, coupons, fees (delivery, installation, and warranty), local charges, deposit fees. Upon calculating the amount of the order, an order sale recording application or system documents a sale of the order, such as the transfer of ownership and removal of an item from the retail establishment's inventory. For each order, single payment amount is calculated.

In one embodiment, payment is completed for the order via a payment processing application that is connected to a financial institution, wherein the order creation application 400 provides payment information to the payment processing application which in turn sends payment information to the financial institution and receives authorization information from the financial institution.

Payment for the order can be obtained at the fuel dispensing station 310 or a point of sale terminal where all types of payment are accepted, including cash, check, electronic cards, EBT cards, vouchers or other cash equivalents. Funds for the payment of the order may be obtained at different times, depending on method of dispense and when the order has been fulfilled.

Upon selecting the manner payment for the order, the user is preferably then prompted to provide an order confirmation in order to authorize payment for the order by the order creation application 400. Upon receiving the request for an order confirmation, the user then confirms the order.

Upon receiving the order confirmation from the local device 200, either the order creation application 400 or the point of sale terminal generates an order and then contacts a financial institution 292, such as a bank, to authorize payment for or reserve funds for purchasing the item or service 220, such as the fuel. Upon authorizing payment or reserving funds, the order creation application 400, the point of sale terminal or the fuel dispensing station 310 then contacts an order management system 294 to process the order. In this manner, a user may purchase fuel simply by providing identification information 222 and location information 227 to a local device 200 and/or order creation application 400 operating on the local device 200.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a computer readable memory medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Cingular, Nextel, etc.), etc.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. Accordingly, the invention is not to be restricted except in light of the appended claims and their equivalents.

The invention claimed is:

1. A system for remotely controlling an operation of a fuel dispensing station comprising:
   a local device including:
      a Global Positioning System (GPS) configured to automatically generate location information associated with a location of the local device,
      a processor configured to execute an order creation application to automatically instruct a communications device of the local device to transmit the location information and a unique identifier associated with a user to a remote server in response to automatic generation of the location information by the GPS, and
      the communications device configured to automatically transmit, a request to dispense fuel, the location information and the unique identifier to the remote server in response to receiving a instructions from the processor; and the remote server in electronic communication with the local device, a computing system and a third party system, the remote server configured to:

identify a fuel dispensing station based on the location information of the local device, wherein the location information comprises location measurements between the fuel dispensing station and the local device;

identify one or more fuel services associated with the fuel dispensing station based at least in part on the location information associated with the fuel dispensing station;

generate an order storing information associated with the request to dispense fuel, the location information of the local device, the identification information associated with the fuel service, and the unique identifier;

obtain pre-authorization from the third-party system based on sensitive information associated with the user which is retrieved from the computing system to initiate dispensing of fuel using the unique identifier, wherein the sensitive information is previously saved in the computing system and the remote sever communicates the previously saved sensitive information retrieved from the computing system to the third-party system;

generate an unlock code based on the order including the information associated with the request to dispense fuel, the location information of the local device, the unique identifier, and pre-authorization received from the third-party system; and wherein the fuel dispensing station is:

in communication with the remote server which retrieved the sensitive information associated with the user which is retrieved from the computing system to initiate dispensing of fuel, the fuel dispensing station including a fuel source and a fuel pump configured to dispense fuel from the fuel source, and the fuel dispensing station configured to: receive the unlock code from the remote server, and wherein the remote server:

signals the fuel dispensing station to switch from a first state, in which the fuel dispensing station is incapable of dispensing fuel to a second state wherein the fuel dispensing station is capable of dispensing fuel, in response to transmitting the unlock code to the fuel dispensing station, and receives payment information from the local device in response to signaling the fuel dispensing station to switch from the first state to the second state.

2. The system of claim 1, wherein identifying the fuel dispensing station includes the remote server generating identification information associated with the fuel dispensing station.

3. The system of claim 1, wherein in response to a completion of dispensing of fuel, the remote server is configured to: transmit a confirmation message to the local device.

4. The system of claim 1, wherein the local device is a smartphone or a mobile vehicular computer.

5. The system of claim 1, wherein the unlock code signals the fuel dispensing station to dispense fuel without further interaction from a user.

6. The system of claim 1 further comprising an order management system in electronic communication with the remote server, wherein the order management system is configured to process the order for fuel.

7. The system of claim 1, wherein the remote server is configured to instruct the fuel dispensing station to switch from the second state to the first state in response to a specified amount of fuel being dispensed.

8. A method for remotely controlling an operation of a fuel dispensing station comprising:

automatically generating, by a Global Positioning System (GPS) of the local device, location information associated with a location of the local device;

automatically instructing, by an order creation application executed by a processor of the local device, a communications device of the local device to forward the location information and a unique identifier associated with a user to a remote server in response to automatic generation of the location information by the GPS; and transmitting, by the communications device of the local device, a request to dispense fuel, the location information and the unique identifier to the remote server in response to receiving a instructions from the processor;

identifying, via the remote server, a fuel dispensing station based on the location information of the local device, wherein the location information comprises location measurements between the fuel dispensing station and the local device;

identifying a one or more fuel services associated with the fuel dispensing station based at least in part on the location information associated with the fuel dispensing station;

generating, via the remote server, an order storing information associated with a request to dispense fuel, the location information of the local device, the identification information associated with the fuel service, and the unique identifier;

obtaining, via the remote server, pre-authorization from the third-party system based on sensitive information associated with the user which is retrieved from the computing system to initiate dispensing of fuel, using the unique identifier, wherein the sensitive information is previously saved in the computing system and the remote sever communicates the previously saved sensitive information retrieved from the computing system to the third-party system;

generate, via the remote server, an unlock code for the fuel dispensing station based on the order including the information associated with the request to dispense fuel, the location information of the local device, the unique identifier and pre-authorization received from the third-party system;

receiving, via the fuel dispensing station in communication with the remote server which retrieved the sensitive information associated with the user which is retrieved from the computing system to initiate dispensing of fuel, the fuel dispensing station including a fuel source and a fuel pump configured to dispense fuel from the fuel source, the unlock code from the remote server;

signaling, via the fuel dispensing station, the fuel dispensing station to switch from a first state, in which the fuel dispensing station is incapable of dispensing fuel to a second state wherein the fuel dispensing station is capable of dispensing fuel, in response to receiving the unlock code; and receiving, via the remote server, payment information from the local device in response to signaling the fuel dispensing station to switch from the first state to the second state.

9. The method of claim 8, further comprising transmitting, by the communications module of the local device, the unique identifier identifying a user to the remote server.

10. The method of claim 9 further comprising forwarding the unique identifier along with the location information to the remote server.

11. The method of claim 8, further comprising, transmitting, via the remote server, a confirmation message to the local device in response to completion of dispensing of fuel.

12. The method of claim 8, further comprising identifying the fuel dispensing station by generating identification information associated with the fuel dispensing station.

13. The method of claim 8, further comprising, instructing, via the remote server, the fuel dispensing station to switch from the second state to the first state in response to a specified amount of fuel being dispensed.

14. The method of claim 8, wherein the local device is a smartphone or a mobile vehicular computer.

15. The method of claim 8, wherein the unlock code signals the fuel dispensing station to dispense fuel without further interaction from a user.

16. A non-transitory computer readable memory medium comprising program instructions for remotely controlling an operation of a fuel dispensing station via a local device in communication with a remote server, wherein the program instructions are executable by a processor of the local device to:
- automatically generate, by a Global Positioning System (GPS) of the local device, location information associated with a location of the local device;
- automatically instruct, by an order creation application executed by the processor of the local device, a communications device of the local device to transmit the location information and a unique identifier associated with a user to a remote server in response to automatic generation of the location information by the GPS; and
- transmitting, by the communications device of the local device, a request to dispense fuel, the location information and the unique identifier to the remote server in response to receiving the instructions from the processor;
- identify, via the remote server, a fuel dispensing station based on the location information associated with the local device, wherein the location information comprises location measurements between the fuel dispensing station and the local device;
- identify one or more fuel services associated with the fuel dispensing station based at least in part on the location information associated with the fuel dispensing station;
- generate, via the remote server, an order storing information associated with a request to dispense fuel, the location information of the local device, the identification information associated with the fuel service, and the unique identifier;
- obtain, via the remote server, pre-authorization from the third-party system based on sensitive information associated with the user retrieved which is from the computing system using to initiate dispensing of fuel, the unique identifier, wherein the sensitive information is previously saved in the computing system and the remote sever communicates the previously saved sensitive information retrieved from the computing system to the third-party system;
- generate, via the remote server, an unlock code for the fuel dispensing station based on the order including the information associated with the request to dispense fuel, the location information of the local device, the unique identifier and pre-authorization received from the third-party system;
- receive, via the fuel dispensing station in communication with the remote server which retrieved the sensitive information associated with the user which is retrieved from the computing system to initiate dispensing of fuel, the fuel dispensing station including a fuel source and a fuel pump configured to dispense fuel from the fuel source, the unlock code from the remote server;
- signal, via the fuel dispensing station, the fuel dispensing station to switch from a first state, in which the fuel dispensing station is incapable of dispensing fuel to a second state wherein the fuel dispensing station is capable of dispensing fuel, in response to receiving the unlock code; and
- receive, via the remote server, payment information from the local device in response to signaling the fuel dispensing station to switch from the first state to the second state.

17. The non-transitory computer readable memory medium of claim 16, wherein the program instructions are executable by a processor to transmit, by the communications module of the local device, the unique identifier identifying a user to the remote server.

18. The non-transitory computer readable memory medium of claim 16, wherein the program instructions are executable by a processor to transmit, via the remote server, a confirmation message to the local device in response to completion of dispensing of fuel.

19. The non-transitory computer readable memory medium of claim 16, wherein identifying the fuel dispensing station by generating identification information associated with the fuel dispensing station.

20. The non-transitory computer readable memory medium of claim 16, wherein the unlock code signals the fuel dispensing station to dispense fuel without further interaction from a user.

* * * * *